Aug. 19, 1958    P. M. G. TOULON    2,848,536
PROCESS FOR OBTAINING VOLTAGE IMPULSES
SPACED OUT IN SEVERAL CONDUCTORS
Filed Oct. 31, 1957    9 Sheets-Sheet 2
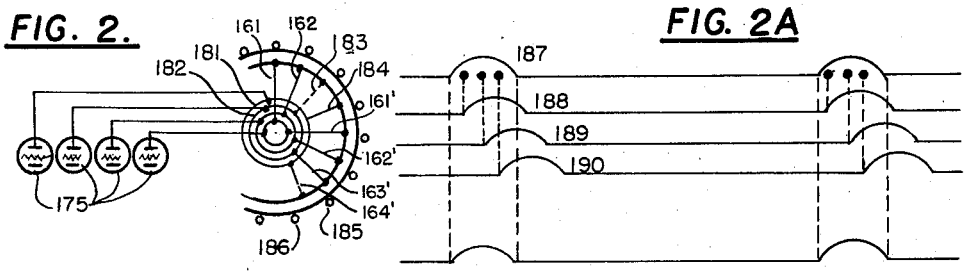
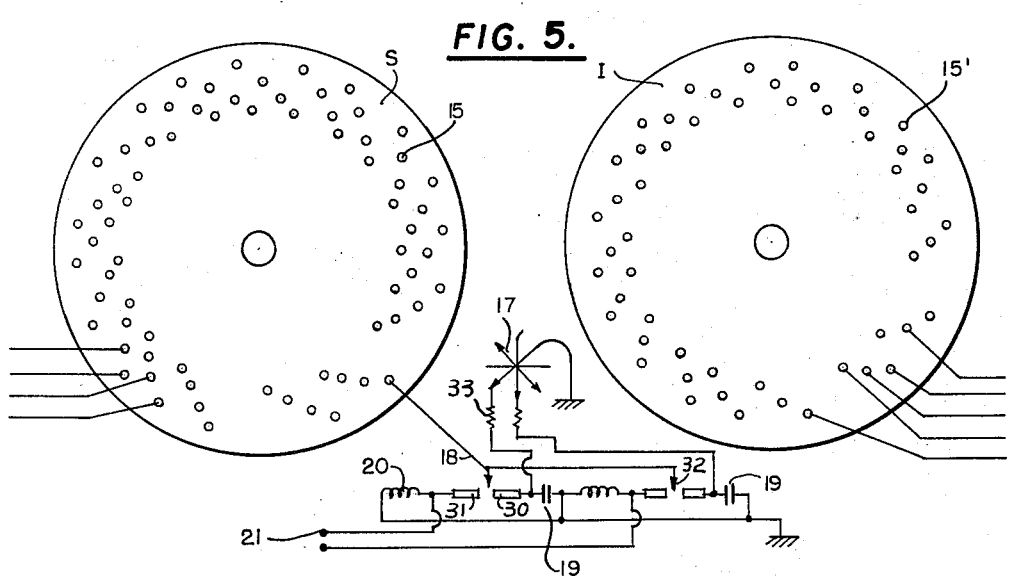
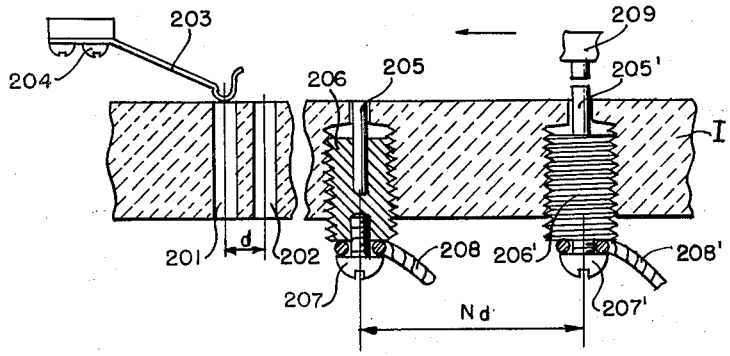
INVENTOR
Pierre M.G. Toulon
BY
Moore & Hall
ATTORNEYS

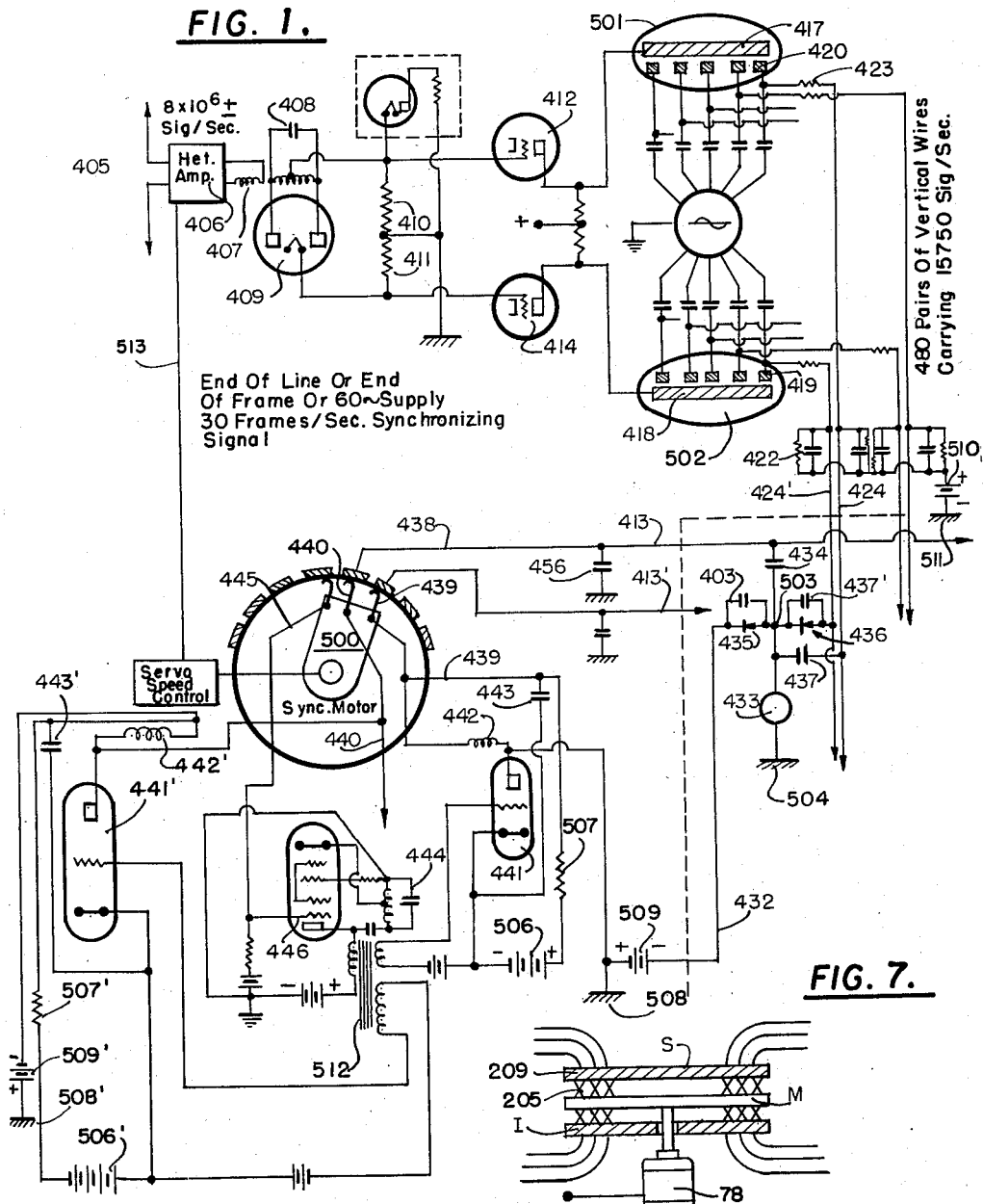

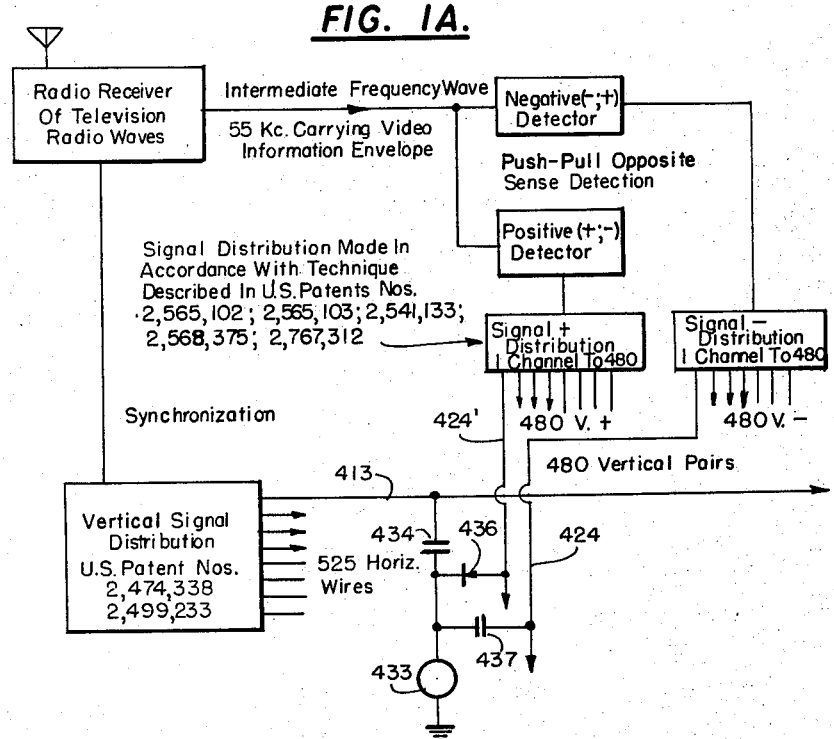
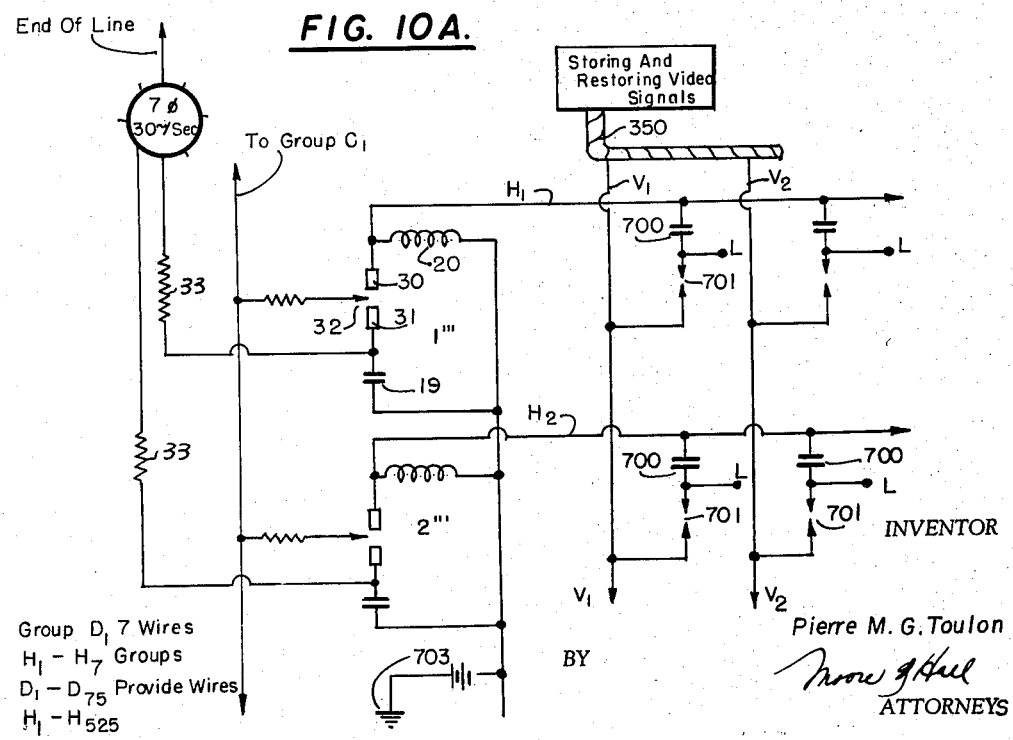

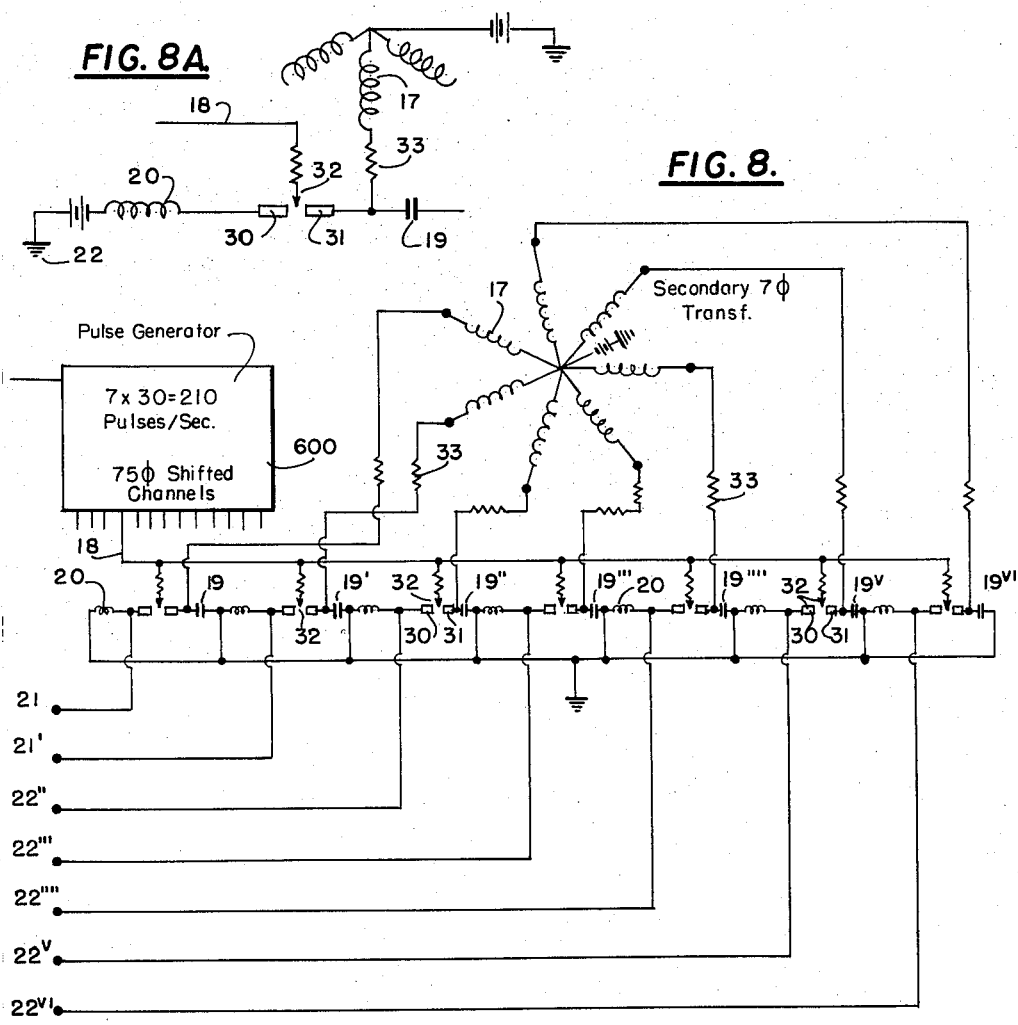
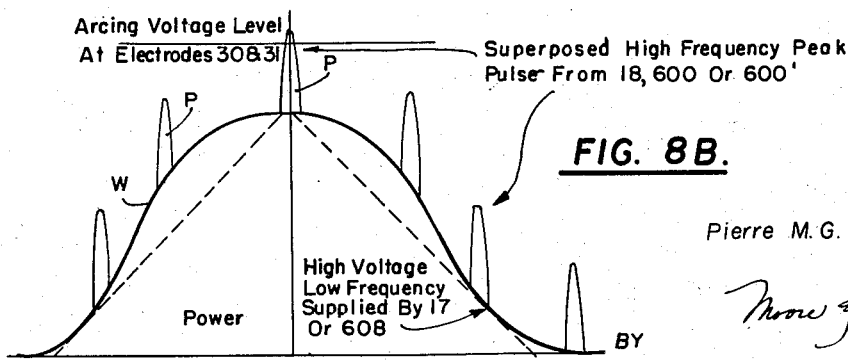

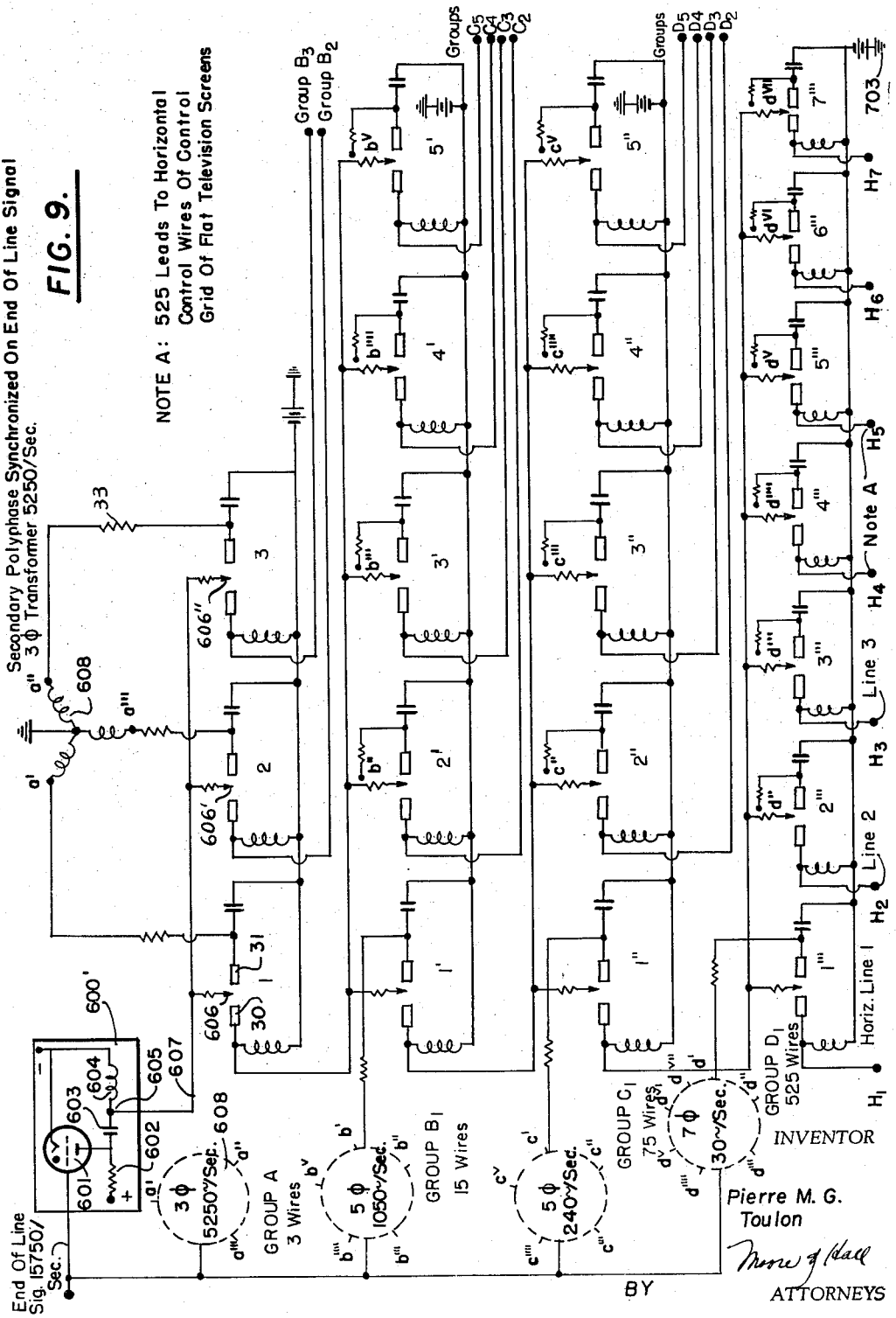

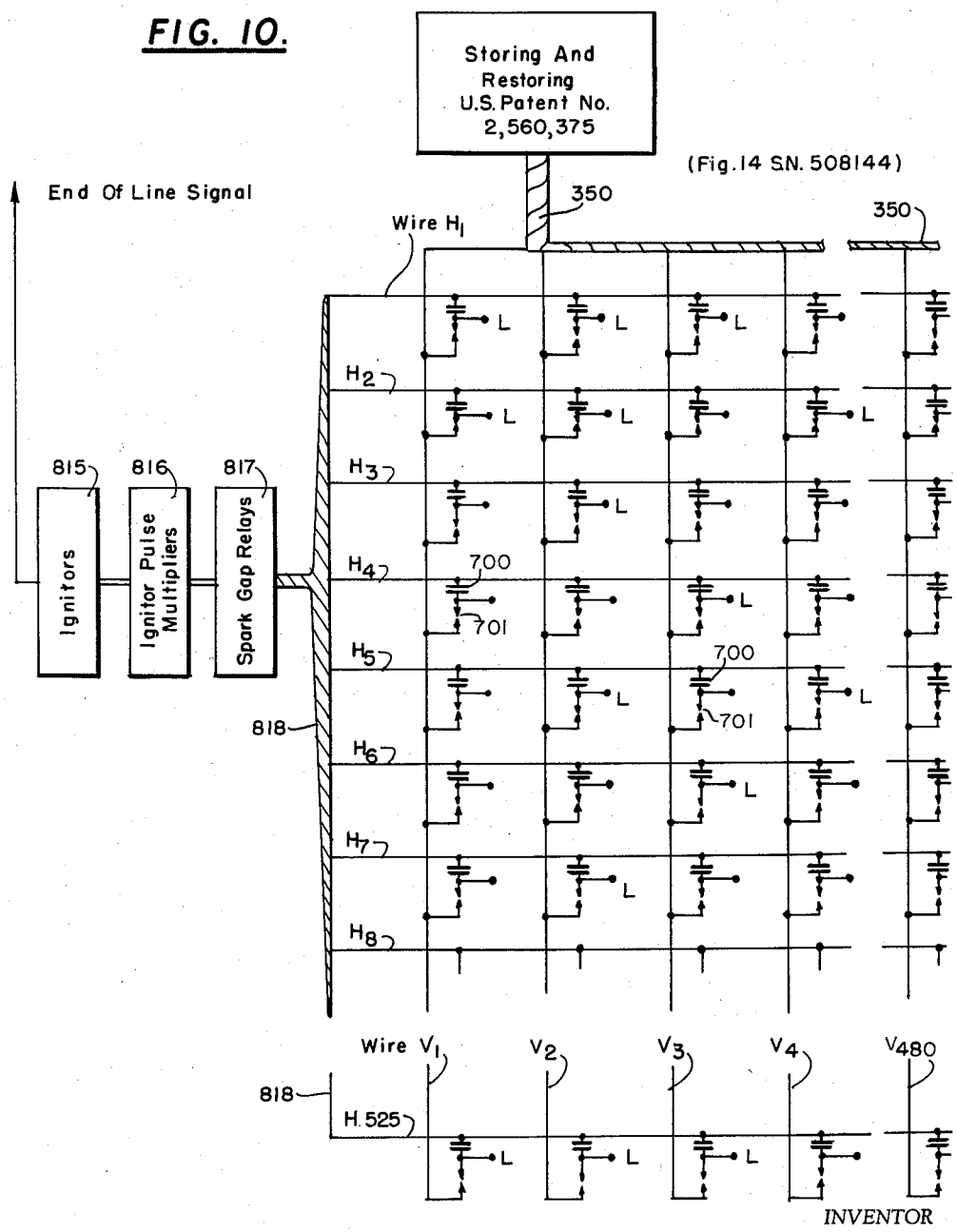

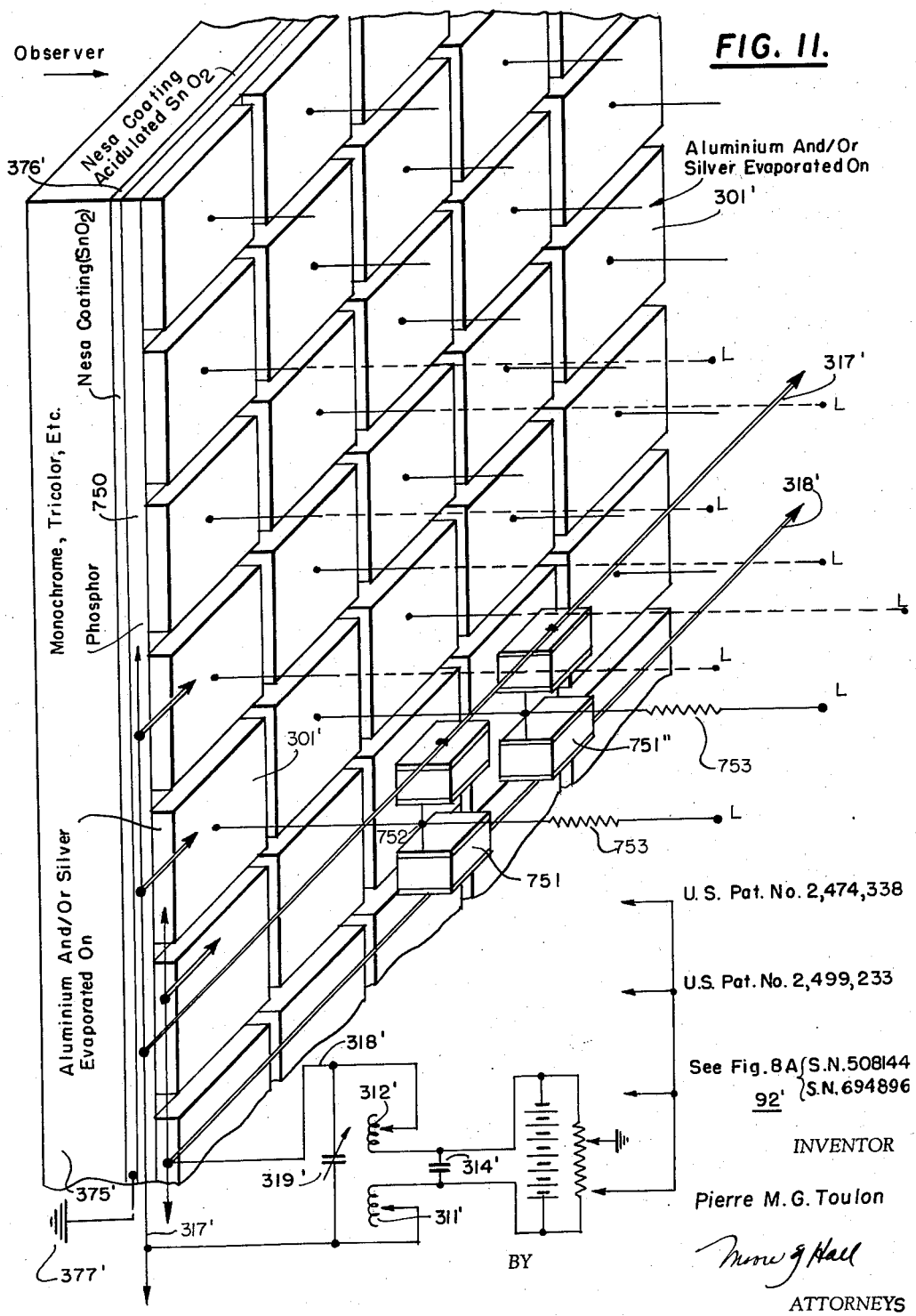

United States Patent Office 2,848,536
Patented Aug. 19, 1958

2,848,536

PROCESS FOR OBTAINING VOLTAGE IMPULSES SPACED OUT IN SEVERAL CONDUCTORS

Pierre Marie Gabriel Toulon, Pittsburgh, Pa.

Application October 31, 1957, Serial No. 693,622

50 Claims. (Cl. 178—50)

The present invention relates generally to a new system for applying voltage pulses to a plurality of independent conductors or channels, the successive voltage pulses having in many cases, differing values. The voltage pulses are intended in particular for effecting distribution of signals occurring on a single channel among a large number of channels. The apparatus and technique have particular application in multiplex telegraphy and to television systems.

In the case of television systems the apparatus herein is adapted to large area flat television screens with grid control of the many elemental light areas comprising the screen. This application is a continuation-in-part of my copending application Ser. No. 12,194, filed February 29, 1948, for Process for Obtaining Voltage Impulses Spaced out in Several Conductors Applying Mainly to Multiplex and Television Problems.

It is an object of the invention to provide a device for use in telephone, telegraph multiplexing where hundreds of conversations are sent simultaneously over a single channel such as wire, radio beam or infra-red beam by use of discrete pulses at a rate well above the highest voice frequency to be transmitted. The operational distribution is reversible and the system is therefore applicable to both sending and receiving operations.

It is an object of the invention to provide tele-servo mechanisms utilizing automatic control whereby complete automation of factories may be obtained. Such tele-servo mechanisms incorporating the invention may control or be controlled by all the apparatus of a ground controlled jet plane with full exchange of information from the jet plane to the ground and from the ground to the plane.

It is an object of the invention to provide tele-servo mechanisms utilizing automatic control for programming computing machines.

It is an object of the invention to provide means for the storing of video information in a television receiving set, for the application of the video information to an electrostatic element or electrostatic light bell representing an elemental picture area such as a picture dot, the light value of which is modulated in accordance with the light level of the corresponding image or picture being televised.

It is an object of the invention to provide means for the elimination of parasitic capacities in rectifiers in computers for signal separation, addition, or subtraction.

It is an object of the invention to provide means for the elimination of parasitic capacities in rectifiers in peak volume control circuits.

It is an object of the invention to provide improved accurate bridge circuits for the measurement of capacity.

It is an object of the invention to provide means for the elimination of parasitic capacity of delay lines.

It is an object of the invention to provide improved circuit means for logarithmic scale change as in volt meters, light meters, response meters and the like.

It is an object of the invention to provide improved measuring instruments having mechanical computors.

It is an object of the invention to provide improved scale distribution and control for mural type television screens having monochrome, two-color, or three-color presentation.

The system of the invention involves the utilization of two independent devices for creating pulses. The first of the devices determines primarily the time of occurrence and the duration of each pulse, while the second of the devices operates to channel the pulses into desired numbers of the plurality of channels. In its broadest aspect, either one of the devices may be mechanical or electrical in nature. One possible system for applying successive voltage pulses to a number of independent channels involves the use of a mechanical rotary distributor which may consist, for example, of a brush revolving in contact with a large number of commutator segments. Each one of the commutator segments thus is connected to one of the channels and as the brush rotates, signals are applied to the channels in succession. However, if the number of commutator segments is very large, as it would have to be in the case of systems for channeling signals to the optical elements of a large screen television, and if the current that is required to be commutated is relatively large and occurs at relatively high voltage, considerable practical difficulties will be met with in the implementation and construction of such a system.

In order to commutate the currents involved, it is necessary that the commutator segment be of relatively large dimension. At the same time, in order to take account of the voltages involved, considerable distance must be provided between the adjacent commutator segments to eliminate flash over. These requirements lead to an extremely large and bulky commutator which must then be rotated relatively slowly for mechanical reasons.

It is accordingly, an object of the present invention to provide a system of signal distribution which utilizes a small commutator capable of distributing large currents to an extremely large number of independent channels without sparking.

It is an object of the invention to utilize spark gap relays connected in cascade for the supplying of pulses to a large number of channels such as in a television screen of the character disclosed in my copending United States application Serial No. 508,144, filed May 13, 1955, for Improvements in Television Systems With Reference to Color and continuation-in-part Serial No. 694,896 of the same title, filed November 6, 1957.

In accordance with the invention, the commutator for effecting the distribution of the pulses may be connected in series with an auxiliary device which serves the function of establishing the timing of the pulses and their duration; that is to say, the time of initiation of each pulse and the time of termination thereof. The commutator itself then performs the exclusive function of channeling the pulses and it is not required for making and breaking electrical circuits in the ordinary sense. Accordingly, the pulses may be initiated while the brush is in circuit with a commutator segment, so that in transferring the brush from one commutator segment to another, no current need be broken, thus eliminating the possibility of arcing, which greatly shortens the life of equipment in this field.

The auxiliary device referred to may comprise a thyratron associated with a condenser, the thyratron serving to discharge the condenser at pre-determined times and the discharge of the condenser establishing the pulses referred to hereinabove. The synchronizing of the thyratron may be accomplished by the application to its, or their controlling electrodes, of periodic voltages of relatively small magnitude which occur in synchronism with rotation of the commutator. Although synchronism in this device may be obtained at all necessary points such as the thyratron, commutators and the like by connection with the end of line or end of frame signal in the normal manner, it will be understood that it has been customary to synchronize synchronous motors of the type used in television and which are here employed to drive the commutator brushes by means of the normal house supply current. This can be done where the power supply is frequency controlled, permitting the synchronous motors to operate in the system for both transmission and reception without employing the usual radiated transmission pulses.

Because with the present improved system the commutator does not serve to make or break the circuit, wear on the commutators caused by the arcing of electric sparking is avoided. Again, the total surface required at each of the commutator segments may be extremely small because the current may be caused to pass through the segments for an extremely short time. Also, the distance between the commutators may be made relatively small because hte commutators are not truly commutators in the ordinary circuit breaking sense of that word, but are merely channelling devices and are not required to make or break circuits while the current is flowing therein.

In order still further to reduce the size of commutators required for application in systems of the character herein described and in accordance with the modification of the present invention, instead of utilizing a single ring of comutator segments and a single rotary associated brush, several rings of commutator segments may be utilized, each associated with its own brush, the latter being connected in succession by means of a further commutating device. The total number of commutator segments in each ring may accordingly be made smaller without reducing the total number of channels to which distribution may be made for a commutator of a given total diameter.

It is accordingly an object of the present invention to provide a signal distribution system capable of distributing signals from a single channel to an extremely large number of channels. In the case of flat screen television systems where there are 525 lines of 480 dots or elemental light areas to a line, the total number of channels served may be thought of as 480 vertical channels and 525 horizontal channels yielding a control suitable for the production of a television picture or the like for 252,000 elemental light areas which may vary in size from a small dot such as may be seen in a half-tone engraving, to an area of a square inch or more such as may appear in a large outdoor type screen.

It is a further object of the invention to provide novel commutation systems.

It is an object of the invention to provide a novel system for distributing pulses among a plurality of channels, the pulses being derived from a single channel.

It is an object of the invention to provide a novel system for the combining of a large number of pulses from a large number of channels into a single channel.

The above and still further objects and advantages of the invention will become evident upon study of the following detailed description of various specific embodiments of the invention, especially when taken in connection with the accompanying drawings wherein like numerals refer to like parts throughout:

Figure 1 is a schematic circuit diagram arranged in accordance with the invention, showing one form of signal distribution system.

Figure 1A is an enlarged section of one portion of Figure 1, with the remainder in block diagram.

Figure 2 is a fragmentary view showing an improvement of the ssytem of Figure 1.

Figure 2A is a timing diagram for explaining the operation of the system illustrated in Figure 2.

Figure 3:
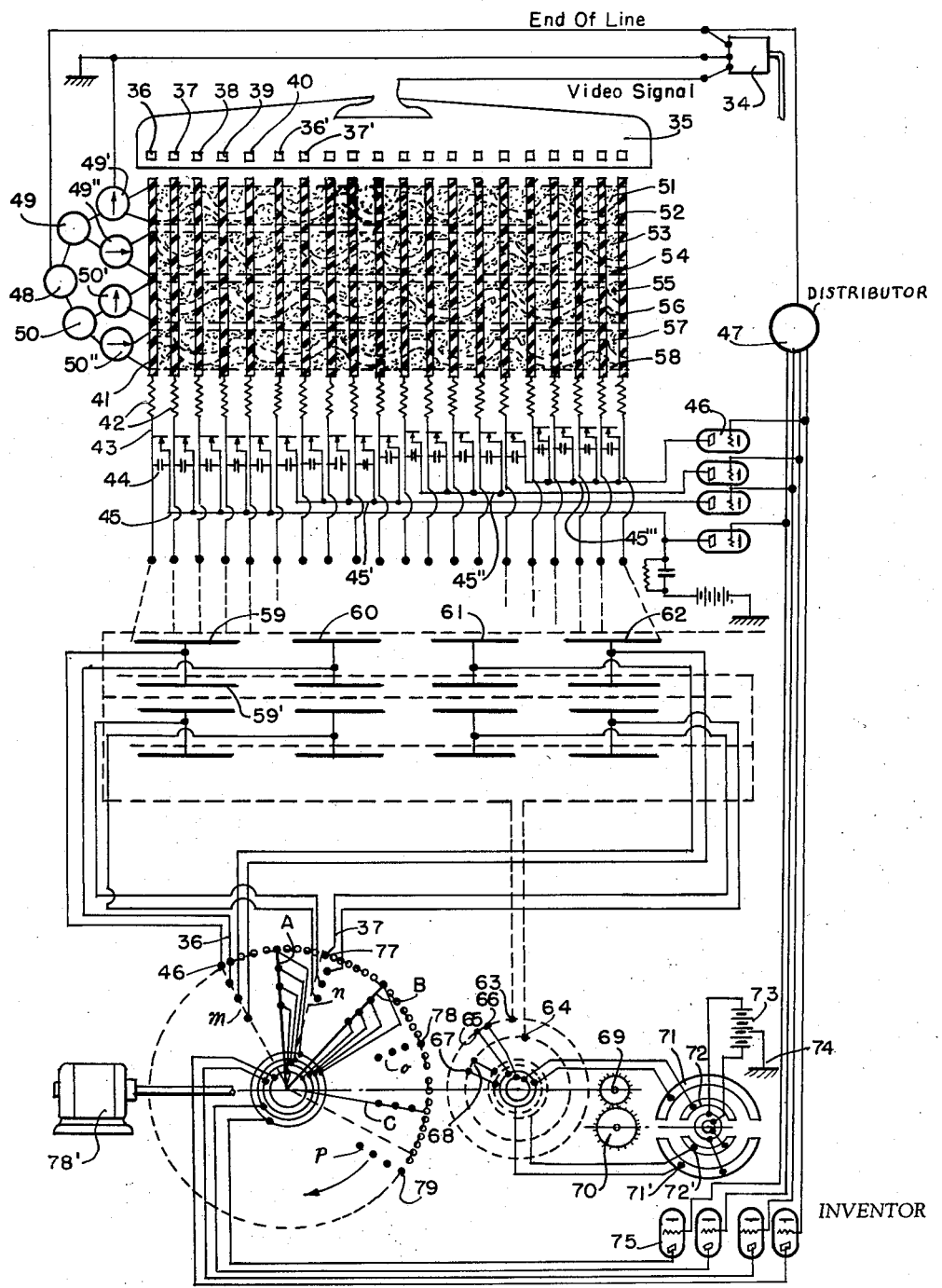

Figure 3 is a schematic circuit diagram of a system for commutating signals to create scanning impulses for reception of a television picture having interlaced lines. Reference is here made to my copending application Serial No. 149,062, filed March 11, 1950; Serial No. 237,372, filed July 18, 1951, and now abandoned; Serial No. 663,055, filed June 3, 1957; and United States Letters Patent No. 2,479,880, granted to me August 23, 1949.

Figure 4:
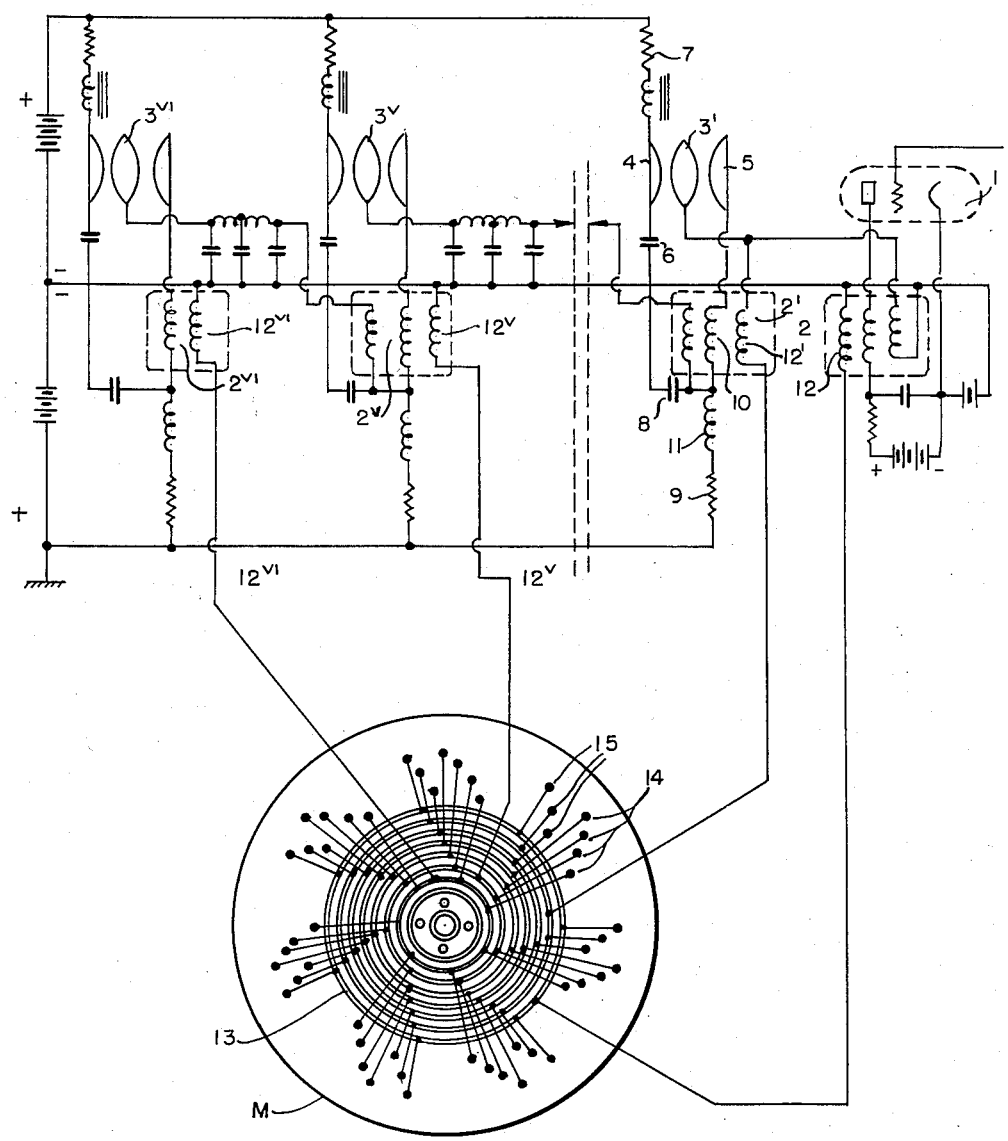

Figure 4 is a schematic circuit diagram of a commutating system utilizing a commutator arranged in accordance with the present invention.

Figure 5 is a plan view showing the construction of commutators in accordance with the invention, coupled with spark gap relays as shown in my U. S. Patent No. 2,499,233, for connection in cascade, whereby a signal from a given source may be supplied to a large number of channels.

Figure 6A is a view in cross-section illustrating the known construction of one type of commutator.

Figure 6B illustrates the respective positions of two fixed electrodes and a moving electrode, in commutators of the type illustrated in Figures 4 and 5.

Figure 7 is a view in section of commutators utilizing spark gaps which may be employed in the system of the present invention.

Figure 8 is a schematic showing of the combination of Figure 5 with an electronic pulse generator in place of the relatively moving plates.

Figure 8A is a fragmentary portion of Figures 5 and 8 enlarged.

Figure 8B is a graph showing the superposition of voltages for controlling and firing spark gap in sequence.

Figure 9 is a schematic showing of spark gap in cascade whereby a single channel signal can be delivered in controlled sequence to five hundred twenty-five channels representing the horizontal lines on a television screen.

Figure 10 is a schematic showing of the vertical distribution of a flat television screen structure such as shown in my copending applications S. N. 508,144 and S. N. 599,960.

Figure 10A is a schematic showing of how the structures of Figures 9 and 10 can be connected.

Figure 11 is a schematic showing of a flat screen structure activated and controlled by the structures of the other figures and forming part of the several inventive combinations.

The schematic circuit of Figure 1 illustrates one general arrangement of a television receiver construction arranged in accordance with one form of the present invention. The system of Figure 1 is utilized to produce in succession on a large number of pairs of wires or conductors represented by a large number of voltage pulses or signals by means of a combination of a thyratron 441 which supplies pulses, and of a commutator 500 which serves to distribute the pulses. Attention is invited in connection with the distribution of pulses, to the teachings in my Electronic Commutator U. S. Patent No. 2,474,338.

In accordance with the system of Figure 1, television signals are received on an antenna 405 and reduced to a suitable intermediate frequency by well known classic means which is amplified in heterodyning amplifier 406. The output of the amplifier 406 is applied to a double plate detector 409, the input circuit of which comprises a condenser 408 and a coil connected in parallel and tuned to the intermediate frequency. The output of the detector 409 consists of two series connected resistors 410 and 411, the junction point of which is grounded so that the voltages appearing across the resistances 410 and 411, respectively, are of opposite polarity with respect to ground. These voltages are amplified in power amplifiers 412 and 414, respectively, and applied respectively to cathodes 417 and 418 of a pair of polyanodic tubes 501 and 502. The number of the anodes 419, 419', 419", etc. in tube 502 and the number of anodes 420, 420', 420", etc. in tube 501 is equal to the desired number of distribution channels and corresponds to the number of points of each horizontal line of a television picture. Each one of the anodes 419, 420 of the two polyanodic tubes 501 and 502 is connected to a capacitive distributor in a manner well known in the art. Each one of the anodes such as 420, 420', etc. is connected to a vertical conductor 424 of the television screen through a decoupling resistance 423. Each one of the anodes 419, 419', etc. is connected to a second vertical conductor such as 424' of the television screen. The two conductors 424 and 424' are arranged mutually in parallel pairs.

Connection of the anodes 419, 420, etc. to the lines 424 and 424' is effected through decoupling elements such as capacitance 422 and resistance 423. The number of pairs of the vertical conductors is made equal to the number of points or elemental picture images of each horizontal line of the television picture which, under present day standards, is 480 points for each of the 525 lines. On each pair of such conductors 424 and 424', is created opposed and equal voltages representative of the video signal, as the latter exemplifies all the points on the vertical line of the picture; that is to say, all the points corresponding with given positions on the respective horizontal lines of the picture where the horizontal lines intersect with the given vertical line connected to the pair 424 and 424'.

A number of condensers 434 are connected between the vertical conductors 424 and various of the horizontal conductors 413, 413', etc. in accordance with the teachings of my prior application for Letters Patent in the United States. Each of the condensers 434 is charged through a rectifier 436. The discharge of condensers 434 is accomplished by means of an additional rectifier 435 disposed between the rectifier 436 and the conductor 432. Rectifiers 435 and 436 are connected to a common junction 503 with condenser 434. An electro optical element 433, which is suitably grounded at 504, is connected to the junction 503 between the two rectifiers 535 and 536. Electro optical element 433 may take the form of a glow lamp, a portion of filamentary tube, or an elemental picture area of a flat television screen as shown in my copending application referred to above as Serial No. 508,144. Each of the conductors 413 and 413', 413", etc. then represents a horizontal line picture while the pairs of conductors such as 424 and 424', etc. represent a vertical line of the picture. The intersection of these two lines represents a point of the picture which may be termed an elemental picture area, of which there are 252,000 in screens of present day standards, comprising 525 horizontal wires, each having 480 picture dots or picture areas. The voltage between the pair of lines 424 and 424' and the line 413 is representative of the video signal corresponding to the respective point and is desired to be impressed on the condenser 434, whence it may be applied to control illumination of the electro optical element 433 or its counterpart as mentioned above.

It will be noted in passing that the light level of each of the 252,000 electro optical elements 433 or their equivalents is modulated according to the charge on condenser 434 and maintained at that level between respective scannings provided the flow of current through the element 433 is sufficiently small. Where the elements 433 are electrostatic, the current flow may be taken to be negligible. Other types of light producing means which require more current will reduce the charge on the condenser 434, which must be sufficiently large so that its decay will not interfere with the light level at the point 433 between successive scannings of that point.

In accordance with the invention, the effects of the parasitic capacity of the rectifier 436 are neutralized by means of a capacity of equal value, 437', which is connected between the conductor 424' and the junction point 503 of the rectifiers 435 and 436. Neutralization occurs because of the opposed voltages on the lines 424 and 424', one of which is utilized to charge the condenser 434, and the other of which is utilized to neutralize the capacity of the condenser 437. Each horizontal conductor 413, 413', etc. is connected to a different segment 438 of a commutator 500. The brushes 439 and 440 which bear on that commutator, accomplish or cause sudden variations of the potential on conductors 413, 413', etc. The first brush 439 applies to the conductor 413 a negative voltage, which serves to remove any residual charge which might exist on the condenser 434. The second brush 440 applies to the conductor 413, for a very short time, a predetermined positive voltage, so that the condenser 434 changes to a voltage which depends upon this predetermined positive voltage.

The operation of the brushes 439 and 440 in normal practice would meet with serious practical difficulties because of the high value of the current which must flow from the brushes to the commutator segments during exceedingly short intervals of time. In order to eliminate commutation difficulties, according to the invention, a thyratron circuit 441 is provided. In series with the anode of the thyratron 441 is connected a coil 442 having considerable inductance, and across the series connected thyratron 441 and the coil 442 is connected a condenser 443. A source of positive voltage 506 is connected through a charging resistance 507 across the condenser 443, inductance 442, connected to the anode of thyratron 441 and is connected to ground 508. The control electrode of thyratron 441 is normally operated with a cut-off bias so that the thyratron 441 is normally in unfired condition. Application of a pulse to the control electrode fires the thyratron and discharges condenser 443 through coil 442, creating substantially an instantaneous voltage pulse which is applied to the brush 439 and from that brush to a horizontal conductor such as 413, and is utilized for discharging the condenser 434 and, in effect, all such condensers corresponding with a given horizontal line of the televised picture.

A precisely similar circuit may be utilized for generating positive pulses for application to the brush 440 as they are applied over the line 413 to the condensers 434 and serve to charge the latter positively, the amount of charge, however, being a function of the modulation signal being applied to the condenser 434 over the line 424 because the modulation signal opposes the highly positive pulse.

It will be noted that the conductor leading from brush 440 in Figure 1 of the drawings is connected to a positive pulse generating circuit comprising an inductor 442' similar to inductor 442. A thyratron 441' similar to thyratron 441, and a condenser 443' similar to condenser 443. The several connections are made to provide a positive pulse from the thyratron 441' rather than a negative pulse such as that supplied by thyratron 441. The positive pulse is applied to condenser 434 through wire 438 and no connection by any other wire is necessary from the other end of the coil 442' which is merely grounded at 508' through a battery 509'.

The overall statement of the operation of the invention as embodied in the television receiver of Figure 1 of the drawings and having a large flat wall type viewing screen, is as follows:

(1) Television signals are received at a rate of about 8,000,000 per second at antenna 405.

(2) The received signals are divided by tubes 412 and 414 connected in push-pull into two symmetrical channels.

(3) The twin channels supply twin signal distribution tubes 501 and 502, having multi-channel twin outputs of four hundred eighty wires, each 424 and 424', and 424", etc. representing the vertical lines of a television screen which are supplied with pulses of opposite sign, simultaneously, one set of twin channels receiving almost 8,000,000 positive pulses per second and the other set almost 8,000,000 negative pulses per second. (Non-symmetrical multianode tubes on which this improves appear in Toulon U. S. Patents Nos. 2,565,102 and 2,565,103.)

(4) Each wire 424, 424', and 424", etc. of each twin set of four hundred eighty wires receives 15,750 television signals per second which are distributed thirty times a second among the five hundred twenty-five dots, 433, 433', 433'', etc., comprising each vertical line of the screen. The distribution of the 15,750 signals on wires 424, 424', and 424'', etc. to the (525×480) 252,000 dots 433, 433', 433'', etc., is accomplished by a cascade system including a storage condenser 422, 422', 422'', etc. as a first stage and a storage condenser 434, 434', and 434'', etc. as a second stage for each dot 433, 433', etc. respectively. Note that the frame frequency of thirty per second is just half the house current frequency of sixty cycles per second.

(5) It will be seen that the above distribution is made in two steps in cascade, each of which employs a single input channel which in turn supplies many parallel output channels simultaneously. This distribution is basically operated by means of a rectifying action between the cathode and plural anodes 419 and 420 of tubes 501 and 502. These anodes 419 and 420 do not pass any current as long as they are biased by a negative voltage and they become fully conductive when they are biased by a positive voltage. These bias voltages operate in much the same way as opening and closing a switch. These blocking or switching voltages are supplied to the anodes 419 and 420 by the generator shown connected to them. The generator is of well known construction for supplying successive anodes 419 and 420 with phase shifted pulses for the blocking and unblocking of the multiple output channels 424, 424', etc.

The pulse generator for the second step of the cascade is the circuit including the mechanical commutator to the left of the dotted line of Figure 1. This circuit supplies the five hundred twenty-five horizontal wires 413, 413', etc. with pulses which are phase shifted by 1/15,750 second to store the instantaneous value of the video signal representing the brightness of dot 433 in the condenser 434.

(6) The basic concept of storage of the successive brightness voltages of each picture dot in a condenser 434 by means of a rectifier 436 was developed at the time this case was filed and is taught in Toulon U. S. Patent No. 2,541,133 (rectifier 6 in Figure 1, whose function is explained in Figure 3), which uses only a single rectifier with a resistance to erase the brightness voltage on condenser 434 slowly so that after 1/30 of a second a new value of brightness voltage representing a new dot picture can be stored in the same way for the next 1/30 of a second, representing a scanning frame. An improved Toulon technique uses two rectifiers 435 and 436 as taught in Toulon U. S. Patent No. 2,568,375 (Figure 4, rectifier 7 for storing and 7' for restoring).

(7) In this application there is provided a storing pulse in each horizontal wire 413 every 1/30 of a second at the time of scanning. This is the pulse which permits the brightness voltage from the wire 424 to be stored in the condenser 434 to control the brightness of picture dot 433 during each scanning frame of 1/30 of a second duration.

(8) Just before each storing pulse appears on wire 413, a restoring pulse of opposite polarity is provided on the wire 413 which makes restoring rectifier 435 conducting and erases the previous brightness voltage on condenser 434, which is then ready to receive the new brightness voltage without interference from the preceding value. The circuit to the left of the dotted line of Figure 1 represents one means of obtaining these storing and restoring pulses of opposite polarity.

(9) It should be noted that the storing pulse must be very short and sharp e. g. 1/3 of 1/15,750 second, while the erasing pulse can be relatively long e. g. 1/10 of 1/30 second, a ratio of about 1:150.

(10) The erasing or restoring pulse is simply obtained by the brush 439 which applies a negative pulse on horizontal wire 413, making rectifier 435 conductive. Alternatively, brush 439 can be connected to a suitable battery, the other terminal of which is grounded, or to the exact counterpart of 441, 442, 443 discussed above.

(11) The storing pulse is obtained from the coil 442' by brush 440. Coil 442' has a very small resistance and there is normally no voltage across its terminals. When the thyratron 441' fires, a very sharp high peak voltage appears across coil 442' and a very sharp storage pulse appears on the particular horizontal wire 413, 413', etc. connected instantaneously to brush 440. The sharp storage pulse is conducted to one of condensers 434, 434', etc. which can then receive the instantaneous video or brightness signal voltage from wire 424' through storing rectifier 436'. In this storing circuit condenser 443', battery 506', resistor 507', ground 508' and battery 509' correspond to their respective unprimed counterparts in the negative pulse circuit of thyratron 441.

(12) It is conventional and well known that a television receiver 406 provides three output channels. In addition to the video or picture signal above discussed, there are the standard end of line channel and end of frame channel which for the past thirty years have been used to synchronize the scanning beam of the picture tube. The motor driving the three brushes is synchronized on the end of frame signal of receiver 406 by connecting to an ordinary power receptacle, or by connection to receiver 406 as indicated by the reference to classical practice on page 8 of the original specification of application Serial No. 12,194 and at col. 6, lines 51–73 of applicant's copending U. S. Patent No. 2,471,253.

(13) It is interesting to note that the invention of Figure 1 was made in France at a time when the ordinary house power supply was 50 cycles per second and the French television standard was 25 frames/second, so that as it happened in France when the invention was made, a conventional four-pole synchronous motor for driving the three brushes need only to be plugged into the ordinary house power outlet without any connection with the end of frame output of receiver 406 as the frequencies were exactly synchronized.

At the time application Serial No. 12,194 was filed in this country the same was true in the United States, as the established standard end of frame signal frequency was thirty frames/second and exactly synchronized on the house power supply of 60 cycles/second. Because of recent changes in standards approved by the Federal Communications Commission in 1955 for color television, this exact relationship no longer holds and an end of frame synchronizing wire connecting receiver 406 and a conventional servo-control mechanism is used today to synchronize the motor with the video signals on wires 424, 424', and 424'' in the classical manner mentioned on page 8 of the specification in U. S. Patent 2,471,253.

(14) Thyratron 441 is fired by a pulse from transformer 512 at exactly the instant when the brush is in the middle of the sector to prevent damage by arcing. The actual firing pulse is triggered by the slight residual charge on the condenser 456 which flows back to the multigrid 446 at the instant of contact of brush 445. This timing is not required for successful operation of the device, but is desirable for long life and is obtained by the control grid of thyratron 441. This grid is normally biased negatively to block the tube and receive a voltage pulse from the oscillator comprising tube 446 and oscillating circuit 444. Oscillator circuit 444 has a resonant frequency of 15,750 cycles per second and is accurately synchronized by the control grid of tube 446 which is actuated in synchronism by a small current from the left brush.

(15) (a) The connection of the end of the counterpart 442' of coil 442 connected to brush 440 is grounded through a battery 509' in the same manner as shown for coil 442.

(b) The mechanical commutator is driven by a synchronous motor as shown in Figure 7, synchronized with the picture signals on wires 424, 424' by connection with ordinary 60 cycle house current.

Again, synchronous operation can be obtained by connection with the end of frame signal from 406 in a standard classical manner referred to above, as well as in Toulon U. S. Patent 2,471,253.

*Storing and restoring*

In the storing and restoring of video signals corresponding to each dot of the picture screen in the condenser 434, 434', 434'', etc., pulses are supplied over the wires 413, 413', etc., in accordance with the teaching in my U. S. Patent No. 2,568,375, reference being made to Figure 8 thereof. Assuming no charge on condenser 434, which in general corresponds to a completely black level of the corresponding dot, a modulated light signal corresponding to the actual light level of the particular picture dot is supplied over wire 424' and through rectifier 436 as described above.

Once this light level, represented by the charge on condenser 434, is established, it remains substantially undiminished for the desired period of time which may be slightly less than the frame period. As the flow of direct current in condenser 434 and electrometer light control system or its phosphorescent equivalent with associated circuitry, is extremely small, this time can be of the order of hours. With normal television standards, this charge on the condensers 434, 434', etc. should be erased every frame so that a new and possibly different value can be applied to element 433.

This erasure of the charge on condenser 434 requires an erasing pulse of opposite polarity to make erasing rectifier 435 conductive. Figure 8 of my above patent shows clearly how a negative pulse (89) is provided to erase and is immediately followed by a positive pulse (85) to make rectifier 436 conductive and permit the storing of the next value of video signal from wire 424' in the condenser 434. The cross-hatched part ($81_2$) of line 6 of the said Figure 8 of the patent shows the prolonged storing of the very short video signal ($81_1$).

To the left of the dotted line of Figure 1 is shown a circuit to provide the successive pulses for storing and restoring in condenser 434 in perfect synchronization with the arrival of the video signals on wire 424'. The negative erasing pulse is supplied by the thyratron 441 through inductor 442 to brush 439, thence through commutator 500, wire 413, through condenser 434 to junction 503 which makes rectifier 435 conducting. The negative pulse together with the preceding video signal charge previously stored on condenser 434 go to ground at 508 through wire 432 and battery 509.

A similar circuitry generates in the inductor 442' and thyratron 441' a positive pulse for storing video signals to the condenser 434. This positive pulse is applied to the brush 440, through commutator 500, wire 438, wire 413, condenser 434, junction 503, where it makes the rectifier 436 conducting and permits the next video signal from wire 424' to flow through junction 503 to condenser 434. The positive pulse circuit is closed by rectifier 436, wire 424', the condenser 422 in which video voltage is stored, battery 510, ground 511 and ground 508'.

It should be noted that the condensers 403 and 437' represent the internal parasitic capacity of their respective rectifiers 435 and 436 which tends to distort the video signal stored in condenser 434. This parasitic capacity is balanced by condenser 437.

It may be noted that between brush 439 and ground 508 there is only the coil 442, the other circuit elements being insulated from ground. In the same way coil 442' is between brush 440 and ground 508', but with the addition of a bias battery 509' which opposes grounding of condenser 434 at ground 508'.

Thyratrons 441 and 441' are fired by means of a pulse from insulating transformer 512 forming part of the oscillating circuit of multi-grid tube 446. The oscillating circuit 444 has a resonant frequency corresponding to the number of segments contacted per second by the brushes of commutator 500. Every time a brush 445 touches a new segment a pulse from condenser 456 appears in the control grid of tube 446 and synchronizes the oscillating voltage of tank 444 with the commutator 500. Therefore thyratrons 441 and 441' are fired just at the appropriate time when the brush 439 is in contact with one segment and the brush 440 is in contact with an adjacent segment. This operation prevents arcing at the segments. The synchronous motor driving commutator 500 is synchronized by the frequency control of the 60 cycle power supply or by the end of frame signal supplied by wire 513 from radio receiver 406.

When the number of horizontal conductors 413, 413', etc. is very high, it becomes essential to utilize a very large number of commutator segments. The present invention has as one of its objects the provision of a novel type of commutator to provide the required number of commutator segments without requiring excessive dimensions for the commutator. For this purpose, the commutator segments are divided into several groups, for example, four, so that in effect four commutators are utilized, each of which comprises ¼ of the total number of segments desired. The segments of each one of these four commutators are slightly displaced angularly with respect to corresponding segments of another one of the four commutators. Segments may be constructed of small staples composed of wire of very large diameter, as for example, 3 mm., which may be mounted through suitable holes in insulating plates, the ends of the staples being fastened behind the plates. The front face of the plate may then be immersed in a polymerizable material, which, after polymerization, may be cut away in such a manner to expose the wires, each of which then constitutes a commutator segment. This construction enables one to obtain a very high insulation between segments despite their close proximity.

The arrangement of the commutator in several mutually displaced groups, which permits supplying a large number of independent conductors, nevertheless does not permit an increase in the frequency of the pulses. If high definition television pictures are to be produced, it is desirable to produce pulses which follow each other at an extremely high repetition rate. This may be accomplished theoretically by sufficiently increasing the speed of rotation of the commutator with respect to the brushes. However, practical limitations severely limit this solution and make it for the present purpose, an undesirable one.

In accordance with a further feature of the present invention, means are provided for producing pulse repetition rates, or frequencies, of extremely high value, without increasing, or even while reducing, the speed of the brush on the commutator segments. This is accomplished by providing a large number brushes instead of a single brush for co-acting with the commutator segments. In accordance with the invention, a large number of brushes may be spaced more or less equi-distantly about a circle concentric with the commutator segment but the distance between adjacent brushes may be slightly greater than the distance between adjacent commutator segments, so that no more than one brush and one commutator segment may make contact at any one time, the point of contact being continually on a circumference of a circle. The number of contacts made per second may thus be very much greater than the number of commutator segments or the number of brushes utilized.

Reference is now made to Figure 2 of the drawings which illustrates the arrangement of a series of brushes 161—162, etc., the number of which may be very considerable, and which are each connected to a different collecting ring 181, 182, etc. Each one of the rings 181, 182, etc. receives, at appropriate moments, a voltage impulse from one of several thyratrons which are fired sequentially by a synchronized oscillator, the latter is synchronized with end of line synchronizing pulses of the television signals. By utilizing thyratrons in the manner described, sparks under the brushes 161, 162, etc. are avoided since current flows in these brushes only after contact has been made between a brush and an appropriate one of the commutator segments, while current is always zero during the actual commutation.

Figure 2A illustrates in the form of a timing diagram, the time relation of the firing of the thyratron and the contacting of the brushes with commutator segments.

The commutator arrangement described in connection with the illustration of Figure 2 of the drawings may be utilized in a television system of the character illustrated in Figure 3 of the accompanying drawings, the general subject matter of which has been disclosed in prior applications, and the primary importance of which relates to the commutator arrangement.

Referring now more specifically to Figure 3 of the drawings, there is illustrated a motor 78', which serves to drive a plurality of arms supporting brushes A, B, C, etc., which are driven simultaneously from the motor 78'. On each of the arms is installed four brushes, each of which is connected to one of four rings, shown concentrically of the commutator structure. Each ring receives an impulse in turn from one of a plurality of thyratrons 75, which are synchronized by a polyphase source, generally indicated at 47, and which is itself synchronized from end of line impulses of a television signal of conventional character.

The groups of brushes may be seen to be arranged in concentric circles of different radius. All the brushes disposed on a common circumference contact fixed segments of the corresponding group of segments in turn, by reason of the relation between the distance between the angular spacing of the brushes with respect to the angular spacing of the commutator segment on each circumference.

In Figure 3 the small hollow circles forming a circumference of the commutator are not to be understood as comprising structure of the commutator, but merely to represent angle markers. It may be seen then, that between a radial line of segment $n$ and a line of segment $m$ there is a space equal to ten times the distance between adjacent circular markers. This same spacing is carried out determining the positions of the segments O with respect to the segments $n$, of the segments $p$ with respect to the segments O, etc. Between the brush carrying arms A and B here is a distance equal to eleven times the interval between two circular markers, and the same applies between each two adjacent types of brushes. As a consequence, each time a brush carrying arm rotates through an angle equal to the distance between two circular markers there exists somewhere on each one of the circumferences one of the brushes which have come into contact to supply pulses to the horizontal wires 59—62, etc. Storage and restorage is obtained by conductors 63 and 64 as shown by commutator 6 of Figure 1 of the U. S. Patent No. 2,474,338. Commutator segments 65 and 66 and brushes 67 and 68 reduce the time of voltage and power required on the needles and are connected by gear 69 and 70 to another commutator having segments 71 and 72, 71' and 72' for reversing needle polarity at the required instant. The spark gap needles referred to are shown in detail in Figure 6B and are discussed below in connection with Figures 3, 4, 5, 6A, 6B and 7. The voltage is supplied by battery 73, which is grounded at 74.

The horizontal distribution shown at the top of Figure 3 corresponds to my U. S. Patent No. 2,565,102 and comprises a multi-anode tube 35 with anodes 36, 37, 38, 39, 40', 36', etc. similar to tubes 48 and 49 of Figure 1 of the patent.

Television receiver 34 supplies end of line and video signals as shown. Oscillator 48 is synchronized on end of lines frequency F. A plurality of oscillators 49 and 50 are synchronized on multiples of F and each supply in phase and phase quadrature oscillators 49', 49", 50', 50", etc. connected to capacity phase shifters 41, 51-58, inclusive, according to Figure 1 of U. S. Patent No. 2,565,102.

Condensers 44 store video signals on vertical wires 43 through decoupling resistors 42 connected capacity phase shifters 41. Thyratrons 46 connected by wire 45, etc., are connected to the end of line signal through distributor 47 and are provided to erase the video signals stored in condenser 44 of one quarter of each line abruptly.

Figure 3 is one form of distribution system according to the invention. Motor 78', which is synchronized on end of frame signal, turns a plate M between two fixed plates S and I. Plates M, S and I are shown in Figures 4, 5 and 7. Motor 78' corresponds to motor 78 in Figure 7. Plate M mounts the needles 205, 205' etc. as shown in Figure 6b. On plates S and I are similar needles that are connected to horizontal wires 59, 60, 61, 62; 59', 60', 61', 62', etc. for four groups as shown. In the case of this figure storage is provided for a quarter of each horizontal line simultaneously, requiring four times as many leads 36 and 37, etc. as there are horizontal picture lines. The moving spark gap needles of plate M are arranged in groups of four phase shifted with respect to each other. The location of the similar needles on the fixed plates are such that the vernier coincidence between fixed needles on plates S and I and moving needles on plate M will occur in succession for every revolution. The arrangement permits good spacing between the spark gap needles giving necessary insulation for high voltage operations. The vernier coincidence occurs in succession in different spaced radii, such as 46, 77, 78 and 79.

Four thyratrons 75 are fired successively by an arcuate distributor 47 synchronized on the end of line signal. The high voltage is high enough to spark across coincident needles.

In the systems of Figures 1, 2 and 3, pulses have been applied for distribution by the commutator mechanism in response to firing of a group of thyratrons, the grids of which are raised to firing potential in response to voltages supplied by a polyphase source, synchronized by television synchronizing signals. Use of the group of thyratrons is, however, expensive and cumbersome. Figure 4 illustrates an improved modification of the present invention, which utilizes spark gaps operating in air, in place of the thyratrons. These spark gaps fire in sequence, with a predetermined delay which determines the time spacing between successive firings. The voltage pulses thus generated are utilized for feeding the input circuit of the rotary distributor in place of the pulses generated in Figure 3, for example, by means of thyratrons.

Reference is accordingly made to Figure 4 of the accompanying drawings, wherein commutator segment connections are illustrated. The rotary part of the commutator is indicated by the disc M. The stationary parts are represented by fixed plates S and I, illustrated more specifically in Figure 7 of the drawings. Each of the fixed plates, and the rotary plate comprise a large number of fixed electrodes which, together, correspond with spark gaps. The use of spark gap commutation involves an advantage over the mechanical commutators heretofore described and illustrated in Figures 1, 2 and 3, inclusive, in that no structure is provide which can wear out due to friction, or which can heat up unduly for the same reason.

Referring now more specifically to Figure 4, there is illustrated at 1 a thyratron which, when fired, causes an abrupt change of potential of central electrode 3' of a spark gap arrangement comprising central electrode 3' and outer electrodes 4 and 5, connected in cascade. The electrode 4 is connected in series with a condenser 6, which is charged to a high potential through a resistance 7. The spark gap 5 on the other hand is connected to a condenser 8 charged to a high voltage via a resistance 9. In series with the spark gap are connected the primary coil 10 of a transformer and a choke coil 11. Upon arrival into the transformer 2 of an impulse supplied by the thyratron, the voltages of the electrodes 4 and 5 are such that the spark is on the point of being formed, this voltage being just insufficient to accomplish sparking. Sudden change in potential of the electrode 3 with respect to ground causes an unbalance of voltage relations between the electrodes 4 and 5, which serves to initiate spark discharge. The two condensers 6 and 8 are then discharged through the spark gap; that discharge applies to the secondary winding 10 of the transformer, considerable power, far greater than that supplied by the thyratron 1 itself.

A fraction of this power may then be applied through a delay line of conventional character, in order to accomplish arcing of a similar spark gap $3^v$. The sparking of $3^v$ is then utilized to generate a spark in the spark gap $3^{vi}$, after a further and similar pre-determined time interval.

Each one of the transformers 2, 2', etc., contains a secondary winding 12, 12', 12", etc., which enables utilization of the successive impulses thus created, the time constant of the delay lines being so chosen that the striking of the spark at each successive spark gaps is shifted by a time properly coordinated with the speed of rotation of the commutator, and with the number of commutator segments and brushes. Successive voltage impulses are utilized by the rotary distributor, in accordance with the system disclosed hereinbefore, in describing the operation of the commutator of Figure 2 and of Figure 3. The rotary disc M may comprise for example, seven concentric groups of seven contacts each, the contacts of each concentric ring being connected to a different slip ring, as 13. The system of Figure 4, accordingly, provides a variant of the system of Figure 3 wherein however, only a single thyratron is required for operation of the system. Thus, all but one of the thyratrons utilized in the system of Figure 3 is replaced by appropriate spark gaps. The latter, while of large number, are all very simple in construction, and identical to one another, so that they are readily replaceable, and furthermore, which are of sufficiently simple character so that they may be readily removed from the assembly for purpose of replacement.

In Figures 5 and 7, moving plate M carries needles similar to 205, which provide a high voltage pulse on coincident needles 205' of fixed plates S and I in turn. Each fixed needle 205' is connected to a plurality of starting electrodes 32 of a three electrode spark gap shown in detail in Figures 5, 8, 8A and 9. Each spark gap comprises two master electrodes 30 and 31 made of a tungsten rod about two millimeters in diameter spaced about two millimeters apart and a small starting electrode 32 of 0.2 millimeter tungsten wire located laterally as shown. A voltage of two or three thousand volts can be applied across the two master electrodes 30 and 31 without discharge, but if a very small discharge, even a corona, appears on the starting electrode wire 32, a full arc appears between the master electrodes 30 and 31.

Each fixed needle 205, 205', etc. is connected by a wire 18 to a plurality of three-electrode spark gaps supplied by a polyphase low frequency distribution system 17 which may be a star-connected transformer having its neutral point grounded. Polyphase transformer 17 supplies a maximum two thousand volt potential across 19, 19', etc. in turn. Decoupling resistances 33 prevent short circuits of the secondary winding as shown in Figures 5, 8, 8A and 9. Every time there is coincidence between moving and fixed needles, a high voltage pulse appears on wire 18 producing a slight discharge on all the parallel connected starting electrodes 32. At each such instant only one condenser 19, 19', etc. has a voltage high enough so that a full arc appears between master electrodes 30 and 31. The arc discharge produces a pulse of short duration in the coil 20 to supply the horizontal wires in turn to operate the vertical distribution of the video signal on the television screen at low speed. This action produces a distribution effect along each pair of wires 21, 21', etc. in turn, which supplies the horizontal wires 413 or 59—62 or condensers 700 of the screen, in turn, with a storing pulse.

The above three-electrode spark gap system greatly increases the available power and permits multiplication of the number of channels supplied.

Figure 8 is a similar relaying and distriution system with the starting pulses supplied by synchronized electronic pulse generator 600 without moving parts as shown in Figure 5.

Pulse generator 600 supplies 210 pulses/sec. and has an output comprising seventy-five phase shifted channels 18, each connected to seven horizontal control wires for a television screen, making 525 wires representing lines on the screen.

Figure 9 is a detailed showing of a complete phase shifted pulse distribution system which may be used for storage and restorage as described above. It may be termed a non-commutating electronic pulsed rectifier signal distribution system and may be used with the systems of Figs. 1, 1A, 3, 4, 10 and 11. Another form of non-commutating electronic pulsed rectifier distribution system is shown at Fig. 6C of my copending application S. N. 555,837, for Television System for High Definition and Secrecy of Image, filed December 28, 1955, which is a continuation of my application S. N. 149,062, filed March 11, 1950, and bearing the same title. The structure of the lower half of Figure 1 may be constructed as a non-commutating electronic pulsed rectifier signal distribution by taking out the commutator and connecting in its place a synchronized pulsing source such as referred to above. Note that rectifiers 435 and 436 would still function for storing and restoring. Pulse generator 600 comprises a thyratron 601, the firing electrode of which is connected to the end of line signal. A direct current supply is connected as shown, to resistor 602 and the cathode of tube 601. A condenser 603 is connected in series between resistor 602 and inductance 604. Every time thyratron 601 discharges, a voltage peak appears at junction 605 and is applied to the starting electrodes 606, 606' and 606" of group A of three-electrode spark gaps on wire 607. A polyphase transformer 608 applies phase shifted voltages of 2000 volts across master electrodes 30 and 31, which arc in sequence as the starting electrodes 32 are energized on end of line signal. Group A comprises three spark gap electrodes. Group B comprises three groups of five spark gaps, supplying fifteen wires. Group C multiplies by five, supplying seventy-five wires. Group D multiplies by seven, supplying five hundred twenty-five wires comprising the horizontal wires of the screens. Generator 600 resembles generator 600', but has seventy-five phase shifted outlets instead of one.

Figure 8A shows an enlarged portion of Figures 5, 8 and 9, producing the composite curve of Figure 8B for controlled firing of the spark gap relays 30, 31 and 32 in controlled sequence. The large low frequency pulse or sign wave W is supplied by the polyphase transformer 17, or 608 and applied across the master electrodes 30 and 31. The smaller peaked high frequency pulse from wire 18 is applied to starting electrodes 32 in groups. For each spark gap in sequence the superposition of P upon W produces a high enough resultant voltage to produce arcing. Good results have been obtained with a voltage ratio W/P of four or five. It is not believed to be critical, and larger ratios should give good results. Only one spark gap in each group of parallel starting electrodes 32 fires at a given instant because only that one spark gap is subjected to a voltage above the arcing level.

Figure 10 is a schematic showing of the vertical distribution of a flat television screen structure. For each dot of the screen is provided a condenser 700 which stores a voltage corresponding to the brightness of the dot to be reproduced. The video signals are distributed among vertical wires $V_1$, $V_2$, etc. Each condenser 700 has a lead connected to a horizontal wire $H_1$, $H_2$, etc. and a lead connected to a local spark gap 701. When a high voltage pulse appears upon a horizontal wire $H_1$, an instantaneous high voltage appears across all the gaps 701 of horizontal wires $H_1$ which then spark simultaneously. The spark short circuits the terminals of the gaps 701 and stores the instantaneous value of the voltage in condenser 700 corresponding to the light level in the particular vertical wire energized. All the gaps 701 in a single row spark simultaneously and that records the instantaneous value on the entire picture line or a half thereof, depending upon the system construction. Because the spark gap 701 conducts current both ways, the new instantaneous value of voltage is recorded. The previous signal passes back along the horizontal wire $H_1$ through induction coil 20 and is grounded at 22 or 703.

Figure 11 is a schematic fragmentary showing of a flat television screen arrangement with distribution control connections for the structure of Figure 10. It will be understood each elemental blocked area of the flat screen of Figure 11 may be substituted for light producing element 433 of Figure 1.

A flat picture screen comprises a glass plate 375' facing the observer and coated on the rear with a coating 376' of acidulated tin oxide, known as a Nesa coating, which is grounded at 377'. Nesa coating 376' is covered with phosphor 750 which may be a monochrome or comprise two, three or more colors, as desired. Individual elemental picture areas are determined by electrodes 301' comprising small squares, circles, or dots of metal such as silver or aluminum evaporated thereon. Where three color television is produced, electrodes or plates 301' are made smaller and the number increased to activate selected colors at the proper modulated light value in correct scanning sequence to produce the color picture corresponding to the actual scene being televised.

Ferro-electric condenser bridges 751, 751', etc., or one of several variants, are connected across horizontal wires 317' and 318' as shown in Figure 8A of my copending application Serial No. 508,144, filed May 13, 1955, to which the primed numbers correspond. The junction 752 of each bridge is connected to one of the electrodes or condenser plates 301' and through a resistance 753 to a corresponding terminal L of Figure 10. The construction and operation of the condenser bridge is described in the above application. The elemental picture areas of phosphor 750, which may take the form of a layer of single color or a pattern of individual dots of different color producing phosphors, are subjected to a modulated electrostatic field between the plates 301' and the grounded Nesa coating 376' whereby the phosphor emits light of the correct level at the correct color to reproduce the actual scene being televised. Film or other record may supply the scenes.

It may be noted that condensers 434, 434', etc. of Figure 1 perform much the same storage function and correspond to condensers 700, 700', etc. of Figures 10A and 11, of which they may be taken to be counterparts. In much the same way, junction 503, 503', etc. of Figure 1 may be taken to be a counterpart of the terminals labelled L in Figures 10A and 11.

Reference is made to my copending U. S. patent as follows:

U. S. Patent No. 2,474,338, granted June 28, 1949, for Electronic Commutation System and its Application, Especially to the Scanning in Television, which provides background for signal distribution herein.

U. S. Patent No. 2,499,233, granted February 28, 1950, for Electronic Relay and Its Application to the Scanning provides background for improved signal distribution with local amplification.

U. S. Patent No. 2,541,133, granted February 13, 1951, for System for Controlling the Flow of Successive Electrical Impulses in a Channel for Improved Signal Distribution, with particular reference to the vertical channels of a television screen.

U. S. Patent No. 2,565,102, granted August 21, 1951, for System for Connecting a Single Channel with a Plurality of Channels in Periodical Succession, and U. S. Patent No. 2,565,103, granted August 21, 1951, for Switching Tube, provide background with reference to circuits in which signals are transferred from a single channel to a plurality of channels such as the vertical wires in a television receiver, radar, or the like, together with the storage of video signals.

U. S. Patent No. 2,767,312, granted October 16, 1956, for Signal Distribution System, and U. S. Patent No. 2,568,375, granted September 18, 1951, for Signal Distribution System, provide background for the improved technique for restoring of video signals and cascade distributions.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. In a signal distribution system, a source of successively occurring signals, a plurality of normally blocked channels, means in each of said channels for unblocking said channel in response to a voltage pulse, a generator for providing periodic voltage pulses, means for distributing said voltage pulses among said channels, said last means comprising a rotary commutator having a moving conductive arm and a plurality of fixed contacts, one corresponding with each channel and contacted by said conductive arms in succession, and means for synchronizing rotation of said arm and timing of said pulses to apply each pulse to a channel via said arm and one of said contacts after establishment of contact between said arm and said one of said contacts.

2. The combination in accordance with claim 1, wherein duration of said pulses is less than duration of contact of said arm with each of said contacts.

3. In a static distributor, a source of video signals, an indicator, a condenser for said indicator, said indicator visually representing the voltage of said condenser, a rectifier connected to charge said condenser, said rectifier having associated parasitic capacity, and means for compensating said parasitic capacity comprising a compensating capacitance, and means for charging said compensating capacitance to a voltage substantially equal and opposite the voltage of said parasitic capacity.

4. In a static distributor, a source of video signals, a first line, a second line, means for applying said video signals in respectively opposite polarity to said first and second lines, a third line, a rectifier, an indicator, means connecting said indicator to said third line, means for connecting said rectifiers between said first and third lines, said rectifier having associated parasitic capacity, and a compensating capacitance connected between said second and third lines.

5. In a static distributor, a source of video signals, a first line, a second line, means for applying said video signals to said first and second lines in respectively opposite polarities, a rectifier, an indicator, means comprising said rectifier for actuating said indicator in response to said source on said first line, said rectifier having parasitic capacity, and means for compensating said parasitic capacity comprising the said source of said second line.

6. In a static distributor, a source of video signals, a first line, a second line, means for applying said video signals to said lines in respectively opposite polarities, a third line, a condenser between said third line and ground, means for charging said condenser in response to voltage on said first line, said means comprising a rectifier between said first line and third line, said rectifier comprising parasitic capacity, and means for compensating said parasitic capacity comprising a compensating capacity connected between said third and second lines.

7. In a signal distributing system, a signal detector, a source of signal, means for applying said signal in push-push relation to said detector, a load circuit for said rectifier comprising a resistance having its mid-point grounded, said signal appearing in opposite polarities at the respective terminals of said resistance, a plurality of two wire lines, and means for distributing said oppositely phased signals in time succession to said two wire lines and in opposite polarities to the separate conductors of each two wire line.

8. The combination in accordance with claim 7, wherein said means comprises a separate distributor for signals of each of said opposite polarities, and a single synchronizing generator for synchronizing the separate distributors simultaneously to distribute identical signals of opposite polarities to said separate conductors of each two wire line at each instant of time.

9. In a static distributor, a source of video signals, a first line, a second line, means applying said video signals to said first and second lines in opposite polarity, a third line, a rectifier, a storage condenser, means connecting said storage condenser in series with said rectifier between said first and third lines, said rectifier having parasitic capacity, and means for compensating said parasitic capacity comprising a compensating condenser connected between said second line and the junction of said storage condenser to said rectifier.

10. In a signal distributing system, a source of video signals, means for separating said video signals into two channels in respectively opposite polarities, a first line, a second line, means for applying said video signals of respectively opposite polarities each to a different one of said first and second lines, a storage condenser, a rectifier, means for charging said storage condenser through said rectifier in response to the signal in said first line, said rectifier comprising parasitic capacity, and means responsive to the signal in said second line for compensating the effect of said parasitic capacity.

11. The combination in accordance with claim 10 wherein said last means comprises a compensating condenser connected to be charged in response to said signal in said second line.

12. The combination in accordance with claim 10, wherein said means for applying said video signals of respectively opposite phase each to a different one of said first and second lines comprises a pair of static distributors, each connected in a different one of said two channels, and a single synchronizing generator for synchronizing operation of said pair of static distributors.

13. In a television system, a source of video signals, a flat picture screen having elemental picture areas, a condenser for each said elemental area, means connected to charge said condenser, said means having associated parasitic reactance, means for compensating said parasitic reactance comprising a compensating reactance, and means for charging said compensating reactance to a voltage substantially equal and opposite to the voltage of said parasitic reactance.

14. In a television system, receiving means for video signals, a flat picture screen having elemental picture areas, activating condenser means for activating each elemental picture area, light control means comprising at least one ferro-electric condenser connected to each said activating condenser means, means to supply video signals to said light control means, means to apply alternating current voltage across said light control means having said ferro-electric condenser comprising relays having at least one main electrode and a starting electrode and means to supply substantially pulsed power to said main electrode at one frequency rate and to said starting electrode at a high frequency rate.

15. The combination set forth in claim 14, said relays having at least some of said starting electrodes connected in parallel.

16. The combination set forth in claim 15, said relays being connected in a plurality of groups in cascade with the starting electrodes of each group being connected in parallel, said relays each having two main electrodes across which said substantially pulsed power is supplied and the higher frequency power supplied to said starting electrode being superposed upon the voltage across said main electrodes whereby the relays in each group are activated in sequence to control the scanning of said screen.

17. The combination set forth in claim 16, said light modulating means comprising a pair of said ferro-electric condensers having substantially their mid-point connected to said activating condenser means.

18. The combination set forth in claim 16, a storage condenser connected to each said activating condenser means for storing a charge corresponding to the video signal being applied to the corresponding elemental area of said screen and maintaining the activating effect of said activating condenser means on said corresponding elemental area for a period greater than one percent the frame period for scanning said screen.

19. In a television system, a source of video signals, a negative multi-anode detector, a positive multi-anode detector connected to said detector to provide push-pull opposite sense detection, a plurality of pairs of distribution wires connected to said detectors and comprising a first control means for one dimension of a flat television screen, a second control means for a second dimension of said screen comprising a plurality of wires cooperating with said pairs of wires for controlling the scanning sequence of elemental picture areas of said screen, video signal storage means for each elemental picture area of said screen and connected to corresponding wires of said first and second control means and means to store video signals in said storage means.

20. The combination set forth in claim 19, said storage means comprising a condenser, said means to store comprising pulsing means and rectifier means whereby said storage condenser may be charged and recharged with a voltage corresponding to the light level of the corresponding elemental area of the scene being reproduced on said screen.

21. The combination set forth in claim 20, said rectifier means comprising parasitic capacity and means responsive to a signal in one wire of each said pairs of wires for compensating the effect of said parasitic capacity.

22. In a multi-element picture screen, comprising a plurality of individual voltage responsive, elemental area, picture elements, said elements being arranged according to predetermined coordinates for activation in a desired sequence, means to apply to each element a pre-determined light producing voltage level, storage condenser means to store said voltage level, means to use the stored voltage to modulate an alternating current and means to use said alternating current to modulate light level locally on said multi-element picture screen, said means to apply light producing voltage comprising groups of a plurality of parallel connected means for applying said voltages for light producing to said storage condensers in accordance with said desired sequence.

23. In combination in a picture producing system, a panel screen comprising elemental picture areas and having an electronic signal distribution grid system for scanning said screen, condenser storage means having a decay period sufficiently long that the modulated light level voltage signal of each elemental picture area of said screen is maintained at substantially the modulated level for the major part of the period between successive scannings of each elemental picture area and thereafter maintained for a similar period at each new successive modulated value for succeeding periods, said condenser storage means comprising individual condenser elements for each elemental area of said screen connected across corresponding portions of said grid system, a relay system for supplying control pulses to said grid for charging and recharging said individual condenser elements, means comprising ferro-electric material to use the stored voltage to modulate an alternating current and means to use said modulated alternating current to produce modulated light locally on said screen.

24. In a control distribution system a first source of recurring signals having a first frequency, a second source of recurring signals having a second frequency at least twice that of said first frequency, a group of relays each comprising two main electrodes across which said first signals are impressed, each relay comprising a starting electrode connected to said second source of signals whereby said relays are operated in sequence.

25. The combination set forth in claim 24, said starting electrodes of each group being connected in parallel, said main electrodes of adjacent relays being connected to a condenser and an inductance and to an output terminal, a second group of relays having their starting electrodes connected in parallel to each said output terminal, there being as many second groups as there are distribution control outputs of said first group, each said second group having a plurality of distribution control output terminals.

26. The combination set forth in claim 25, a third group of relays having their starting electrodes connected in parallel to each said distribution control output of each said second group, each said third group of relays having a plurality of distribution control outputs.

27. The combination set forth in claim 26, a flat television screen comprising a plurality of voltage responsive elemental picture areas, a flat television screen control grid comprising a group of vertical conductors and a group of horizontal conductors, a source of video signals, said grid having a light modulation control section for each elemental picture area of said screen comprising a video signal storage condenser connected to corresponding vertical and horizontal conductors.

28. The combination set forth in claim 27, a storing and restoring means connected in series with each said storage condenser, said elemental picture areas of said screen having light producing means and phosphor activating condenser means for each said elemental area, each said activating condenser means being connected to the junction of the corresponding storage condenser and said storing and restoring means.

29. The combination set forth in claim 28, a ferro-electric condenser means connected between each activating condenser means and the junction with each said storage condenser for improving the light modulation of each elemental picture area.

30. The combination set forth in claim 29, said ferro-electric condenser means comprising a pair of ferro-electric condensers in series and having their junction connected to said elemental area activating condenser means and means for applying modulated alternating current to each said ferro-electric condenser pair.

31. In a programming system in combination, a piloting spark gap having two main discharge electrodes, a plurality of individual spark gaps, connected to be discharged by said piloting spark gap and control means to select particular ones of said plurality of individual spark gaps for discharge by said piloting spark gap.

32. In a programming system, at least one pilot spark gap, a group of individual spark gaps connected to be discharged by said piloting spark gap, control means connected to select particular ones of said group of indi-
vidual spark gaps for discharge by said pilot spark gaps and output means for said individual spark gaps.

33. The combination set forth in claim 32, condenser means connected between the input and ground for each said individual spark gap.

34. The combination set forth in claim 33, a plurality of said groups of individual spark gaps and at least one said control means for each said group.

35. The combination set forth in claim 34, said output means for said groups of spark gaps providing plural connections for joint control by one or more of the several groups of individual spark gaps.

36. The combination set forth in claim 35, ferro-electric condenser means connected to said output means for modulation and amplification of the output.

37. The combination set forth in claim 36, an electro-illuminescent panel connected to said ferro-electric condenser means for controlled activation of said panel.

38. The combination set forth in claim 37, said panel comprising a television screen having a plurality of elemental picture areas, said ferro-electric condenser means having an individual ferro-electric modulating condenser element for each elemental picture area of said panel.

39. An amplifying system comprising a relatively low voltage high frequency source connected to a pilot spark gap, voltage control means for said pilot spark gap, at least one relatively high voltage low frequency source connected to a main discharge spark gap connected to be fired by said pilot spark gap, a relatively high power supply for said length power spark gap, said high power spark gap being fired by voltage addition of voltages of said relatively low power and said relatively high power from said control means and said supply and output means for said high voltage discharge.

40. The combination set forth in claim 39, a plurality of said main discharge spark gaps comprising a first group, a second group of main discharge spark gaps connected to said first group and to said output means.

41. The combination set forth in claim 40, and selection means connected between said groups for the selective discharge of spark gaps in said second group.

42. In a control system, a first source of signals, a second source of signals having a plurality of phase-shifted outlets, a plurality of groups of spark gaps each comprising a pair of main electrodes and a starting electrode, means connecting said pairs of main electrodes to said first source of signals, means connecting said groups of starting electrodes to said phase-shifted outlets of said second source of signals, and output means for said spark gaps.

43. In a flat screen television control system, a first source of signals, a second source of signals, a plurality of spark gap relays each having a pair of electrodes, said signal sources each having a plurality of outlets, and means connecting said spark gap relays to said first and said second sources of signals, said connecting means comprising a storage condenser in series with the electrode of each said spark gap, and signal output means for said storage condensers for using the voltage stored therein, whereby the combined action of said first and second signal sources charges said storage condensers selectively, said flat screen comprising a plurality of elemental picture areas and circuit means connecting each said storage condenser to a corresponding elemental picture area whereby to produce a television picture.

44. In combination in a television system, a source of video signals, a picture screen having a large number of elemental picture areas disposed according to selected coordinates to form said picture screen, a video signal storage condenser connected to each said elemental picture area for storing video signals for illuminating the respective elemental picture area, a non-commutating electronic pulsed rectifier signal distribution means for supplying video signals from said source to each said elemental picture area and to its associated storage condenser to charge said condenser, said signal distribution means comprising means to select elemental picture areas and their respective storage condensers for video signal distribution with respect to said coordinates in accordance with a predetermined field and frame sequence and means to supply sychronized video signals to said elemental picture areas and their respective associated storage condensers to produce a picture on said screen, each said elemental picture area and its associated storage condenser being so constructed that a video signal stored in each said storage condenser retains an effective signal value representing the light level of the respective video signal being stored at least ten percent of the duration of a frame.

45. The combination set forth in claim 44, ferro-electric condenser means connected to each said elemental picture area and its associated storage condenser for control of said video signals, said screen comprising an electro-luminescent panel having said elemental areas thereon.

46. The combination set forth in claim 45, said signal distribution means comprising a plurality of spark gaps.

47. The combination set forth in claim 46, said signal distribution means comprising a pulse generator, forming a first source of signals, a second source of signals of lower frequency than said first source, said spark gaps comprising relays each having a pair of main electrodes, and a starting electrode, means connecting said pairs of main electrodes to said second source of signals, means connecting said starting electrodes to said first source of signals and means connecting said spark gap relays to said storage condensers.

48. The combination set forth in claim 44, said signal distribution means having means connected to charge said storage condensers individually, said means connected to charge having associated parasitic reactance, means for compensating said parasitic reactance comprising a compensating reactance, and means for charging said compensating reactance to a voltage substantially equal and opposite to the voltage of said parasitic reactance.

49. The combination set forth in claim 48, said picture screen being substantially flat and having a thickness substantially independent of its other dimensions, said elemental picture areas comprising electro-optical elements.

50. The combination set forth in claim 44, said non-commutating electronic pulsed rectifier signal distribution means comprising a static distributor with phase-shifted outlets and a plurality of biased rectifiers which are electronically unbiased in turn.

References Cited in the file of this patent

UNITED STATES PATENTS

| | | |
|---|---|---|
| 1,712,739 | Symonds | May 14, 1929 |
| 1,759,504 | Gray | May 20, 1930 |
| 1,823,586 | Burdick | Sept. 15, 1931 |
| 2,110,172 | Phinney | Mar. 8, 1938 |
| 2,339,682 | Cox | Jan. 18, 1944 |
| 2,365,450 | Bliss | Dec. 19, 1944 |
| 2,400,574 | Rea et al. | May 21, 1946 |
| 2,479,020 | Perlmulder | Aug. 16, 1949 |
| 2,774,813 | Livingston | Dec. 18, 1956 |
| 2,818,531 | Peek | Dec. 31, 1957 |